US012342112B2

(12) United States Patent
Ding et al.

(10) Patent No.: US 12,342,112 B2
(45) Date of Patent: Jun. 24, 2025

(54) LOUDSPEAKER MODULE AND ELECTRONIC DEVICE

(71) Applicant: GOERTEK INC., Shandong (CN)

(72) Inventors: Qingxia Ding, Shandong (CN); Qizhong Wang, Shandong (CN); Zongjun Mou, Shandong (CN)

(73) Assignee: GOERTEK INC., Weifang (CN)

( * ) Notice: Subject to any disclaimer, the term of this patent is extended or adjusted under 35 U.S.C. 154(b) by 280 days.

(21) Appl. No.: 17/778,461

(22) PCT Filed: Nov. 6, 2020

(86) PCT No.: PCT/CN2020/126902
§ 371 (c)(1),
(2) Date: May 20, 2022

(87) PCT Pub. No.: WO2021/098528
PCT Pub. Date: May 27, 2021

(65) Prior Publication Data

US 2022/0408167 A1 Dec. 22, 2022

(30) Foreign Application Priority Data

Nov. 22, 2019 (CN) ......................... 201911156400.0

(51) Int. Cl.
*H04R 1/02* (2006.01)
*H04R 1/28* (2006.01)
*H04R 31/00* (2006.01)

(52) U.S. Cl.
CPC ............. *H04R 1/02* (2013.01); *H04R 1/2888* (2013.01); *H04R 31/006* (2013.01); *H04R 2201/029* (2013.01); *H04R 2400/11* (2013.01)

(58) Field of Classification Search
CPC ........ H04R 1/2888; H04R 1/30; H04R 1/345; H04R 31/006; H04R 2201/029; H04R 2201/34; H04R 2400/11
See application file for complete search history.

(56) References Cited

U.S. PATENT DOCUMENTS 3,957,134 A 5/1976 Daniel
9,693,141 B2 * 6/2017 Sprinkle .................. H04R 7/04
(Continued)

FOREIGN PATENT DOCUMENTS

CN 207070291 U 3/2018
CN 111083582 A 4/2020
(Continued)

OTHER PUBLICATIONS

International Search Report from International Application No. PCT/CN2020/126902 mailed Feb. 18, 2021.

*Primary Examiner* — Huyen D Le
(74) *Attorney, Agent, or Firm* — Shih IP Law Group, PLLC

(57) ABSTRACT

The present disclosure provides a loudspeaker module and an electronic device. The loudspeaker module comprises a module housing and a loudspeaker unit, wherein the module housing has a cavity and the loudspeaker unit is accommodated in the cavity, the loudspeaker unit divides the cavity into a front acoustic cavity and a rear acoustic cavity; wherein a sound outlet hole is provided on the module housing, the front acoustic cavity is communicated with the sound outlet hole by a sound outlet channel; wherein a concave-convex structure is provided separately in a region of the module housing corresponding to the sound outlet channel. According to the present disclosure, resonance of the module housing can be effectively suppressed, to achieve
(Continued)

the effects of increasing high-frequency sensitivity of the loudspeaker module and reducing distortion.

9 Claims, 2 Drawing Sheets

(56) References Cited

U.S. PATENT DOCUMENTS

| | | | | |
|---|---|---|---|---|
| 9,998,821 | B2 | 6/2018 | Qin et al. | |
| 2016/0212523 | A1* | 7/2016 | Spillmann ................ | H04R 1/30 |
| 2018/0063636 | A1* | 3/2018 | Spillmann ............. | H04R 1/323 |

FOREIGN PATENT DOCUMENTS

| | | | |
|---|---|---|---|
| EP | 1178702 | A2 | 2/2002 |
| KR | 102034696 | B1 | 10/2019 |

* cited by examiner

LOUDSPEAKER MODULE AND ELECTRONIC DEVICE

TECHNICAL FIELD

The present disclosure relates to a technical field of electronic products, in particular to a module housing and a loudspeaker module mounted with the module housing.

BACKGROUND ART

With the development trend of electronic products towards lightweight and slim, the requirement for thickness of loudspeaker modules is higher. Due to height limitations of the loudspeaker modules, a wall thickness of a module housing is generally reduced to increase an internal space, so injection molding of steel sheet inserts on the module housing is required to enhance the strength of the module housing. The currently used injection molding process of the steel sheet inserts includes: bending a circumference of a steel sheet, and embedding it into plastic when the module housing of the loudspeaker module is injection molded, thereby forming the module housing.

However, when assembling the current module housing, it is easy to make a center of an upper module housing sag, resulting in too small volume of a front acoustic cavity of the loudspeaker module, thus airflow velocity is uneven, airflow sound is generated, thus affecting product performance and user's experience.

SUMMARY

In view of the above problems, the present disclosure is directed to providing a loudspeaker module and an electronic device, to solve the problems that the existed module housing is easily deformed, which affects the volume of the acoustic cavity of the product, resulting in unstable product performance and poor user's experience etc.

The loudspeaker module provided by the present disclosure includes a module housing and a loudspeaker unit, wherein the module housing has a cavity and the loudspeaker unit is accommodated in the cavity, and the loudspeaker unit divides the cavity into a front acoustic cavity and a rear acoustic cavity, wherein a sound outlet hole is provided on the module housing, and the front acoustic cavity is communicated with the sound outlet hole through a sound outlet channel, wherein a concave-convex structure is provided separately in a region of the module housing corresponding to the sound outlet channel.

Further, preferably, the module housing includes an upper module housing and a lower module housing that are coupled to each other, wherein the upper module housing includes an injection molding portion and a main body portion embedded in the injection molding portion, wherein at least a part of the injection molding portion is coupled to the lower module housing, wherein the main body portion includes a combining portion combined with the injection molding portion and a central portion located inside the combining portion, the concave-convex structure is disposed on the central portion.

Further, preferably, the concave-convex structure includes a wave-shaped structure or a zigzag-shaped structure regularly distributed on the module housing.

Further, preferably, when the concave-convex structure comprises a wave-shaped structure, the concave-convex structure includes two peaks and three valleys disposed separately.

Further, preferably, the concave-convex structure includes an annular protrusion and an annular groove separately provided on the module housing.

Further, preferably, the concave-convex structure includes an arc-shaped protrusion and an arc-shaped groove regularly distributed on the module housing.

Further, preferably, an alignment slot is provided on the combining portion, wherein the alignment slot is a continuous alignment slot surrounding the combining portion, or wherein the alignment slot is at least two alignment slots separately provided on the combining portion.

Further, preferably, the main body portion is a steel sheet or an alloy sheet.

Further, preferably, the concave-convex structure and the main body portion are integrally formed.

Another aspect of the present disclosure provides an electronic device including the above loudspeaker module.

According to the above-mentioned loudspeaker module and electronic device, a concave-convex structure is provided separately at a position of the module housing corresponding to the sound outlet channel, a vibration space of the front acoustic cavity of the loudspeaker module is increased through the concave-convex structure, the symmetry of the vibration system is improved and distortion is reduced. In addition, the concave-convex structure can also improve the overall strength of the module housing, reduce the resonance of the housing, and suppress the airflow sound due to poor airflow in the front acoustic cavity, so that the loudspeaker product has stable performance and low distortion rate.

To achieve the above and related objects, one or more aspects of the present disclosure include features that will be described in detail later. The following description and accompanying drawings illustrate certain exemplary aspects of the present disclosure in detail. However, these aspects indicate only some of the various ways in which the principles of the present disclosure may be employed. Furthermore, the present disclosure is intended to include all such aspects and their equivalents.

BRIEF DESCRIPTION OF THE DRAWINGS

Other objects and results of the present disclosure will become more apparent and easy to be understood by the following description with reference to the accompanying drawings and with a more comprehensive understanding of the present disclosure. In the drawings.

REFERENCE NUMERALS

Figure 1:
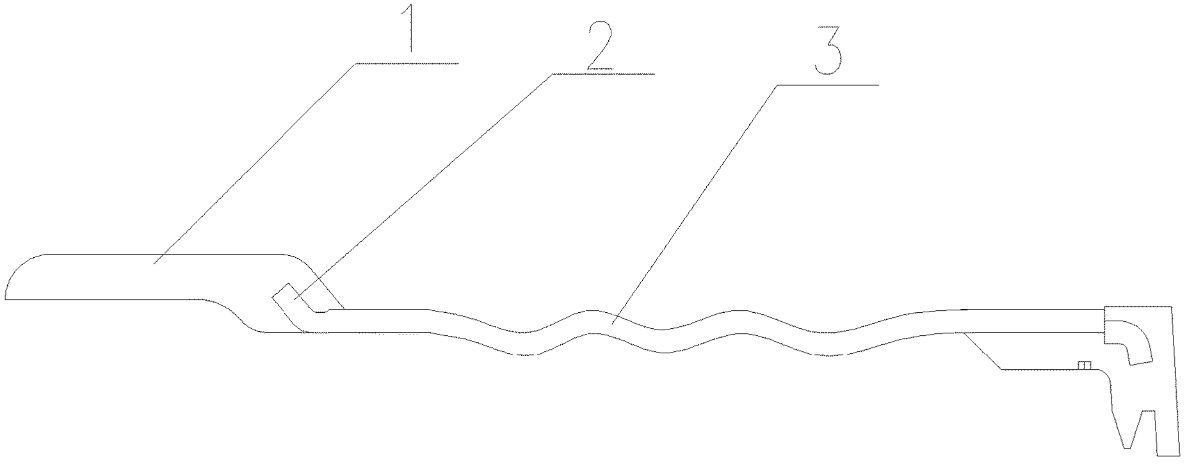
FIG. 1 is a schematic view illustrating a structure of a module housing of a loudspeaker module according to a first embodiment of the present disclosure.

1: injection molding portion; 2: combining portion; 3: wave-shaped structure; 4: arc-shaped protrusion; 5: arc-shaped groove.

Throughout the drawings, same reference numerals indicate or represent same or similar features or functions.

DETAILED DESCRIPTION OF THE EMBODIMENTS

In the following description, for the purpose of illustration, many specific details are described so as to provide a comprehensive understanding of one or more embodiments of the present disclosure. However, obviously, the embodiments may be also implemented without these specific details. In other examples, in order to facilitate describing one or more embodiments, well-known structures and devices are shown in the form of block diagrams.

In order to solve the problems that the existed module housing is easily deformed, which affects the volume of the cavity of the product, resulting in large fluctuation of the airflow velocity in the cavity etc., the present disclosure provides a loudspeaker module including a module housing having a cavity and a loudspeaker unit accommodated in the cavity, and the loudspeaker unit divides the cavity into a front acoustic cavity and a rear acoustic cavity. A sound outlet hole is provided on the module housing, and the front acoustic cavity is communicated with the sound outlet hole through a sound outlet channel, and a concave-convex structure is provided separately in a region of the module housing corresponding to the sound outlet channel. The concave-convex structure improves the volume of the front acoustic cavity of the product, increases the overall rigidity of the upper module housing, and effectively suppresses the airflow sound caused by poor airflow in the front acoustic cavity. In addition, the product has a simple structure and stable performance.

In order to describe the structure of the module housing of the present disclosure in detail, specific embodiments of the present disclosure will be described in detail below with reference to the accompanying drawings.

FIG. 1 shows a schematic structure of a module housing according to a first embodiment of the present disclosure.

As illustrated in FIG. 1, a loudspeaker module according to the first embodiment of the present disclosure includes a module housing and a loudspeaker unit, wherein the module housing has a cavity and the loudspeaker unit is accommodated in the cavity, and the loudspeaker unit divides the cavity into a front acoustic cavity and a rear acoustic cavity. A sound outlet hole is provided on the module housing, the front acoustic cavity is communicated with the sound outlet hole through a sound outlet channel. A concave-convex structure is provided separately in a region of the module housing corresponding to the sound outlet channel.

As a specific embodiment, the module housing includes an upper module housing and a lower module housing coupled to the upper module housing. The upper module housing further includes an injection molding portion 1 and a main body portion embedded in the injection molding portion 1. Wherein, at least a part of the injection molding portion 1 is used for connecting to and fixing with the lower module housing. The main body portion includes a combining portion 2 combined with the injection molding portion 1 and a central portion located inside the combining portion 2, the combining portion 2 is injection molded into the injection molding portion 1. In other words, other parts of the main body portion, except for the structure of the main body portion injection molded into the injection molding portion 1, can be considered as the central portion. In order to improve the strength of the upper module housing and reduce influence thereof on the front acoustic cavity of the loudspeaker module, a concave-convex structure distributed separately is disposed on the central portion.

In the first embodiment, the central portion can be provided as a rectangular structure or a circular structure or else according to the shape of the product, and the corresponding concave-convex structure includes a wave-shaped structure 3 or a zigzag-shaped structure regularly distributed on the central portion. For example, in a specific example as shown in FIG. 1, the concave-convex structure comprises a wave-shaped structure 3, and the wave-shaped structure 3 includes two peaks and three valleys disposed separately, the numbers of the peaks and the valleys and the heights of the peaks and the valleys can be adjusted according to production requirements and manufacturing process of the product, and no specific limitations are made here.

In a specific embodiment of the present disclosure, in order to improve the firmness of the connection between the combining portion 2 and the injection molding portion 1, an alignment slot or an alignment bending may also be provided on the combining portion 2, and the alignment slot or the alignment bending can increase the contact area between the combining portion 2 and the injection molding portion 1, so as to increase the stability of the upper module housing.

Specifically, the alignment slot may be provided as a continuous alignment slot surrounding the combining portion 2, or at least two alignment slots provided separately on the combining portion 2.

It should be noted that the main body portion can be a steel sheet or another alloy sheet, and the concave-convex structure can be directly provided on the main body portion through a processing technology, that is, the concave-convex structure and the main body portion are integrally formed.

Figure 2:
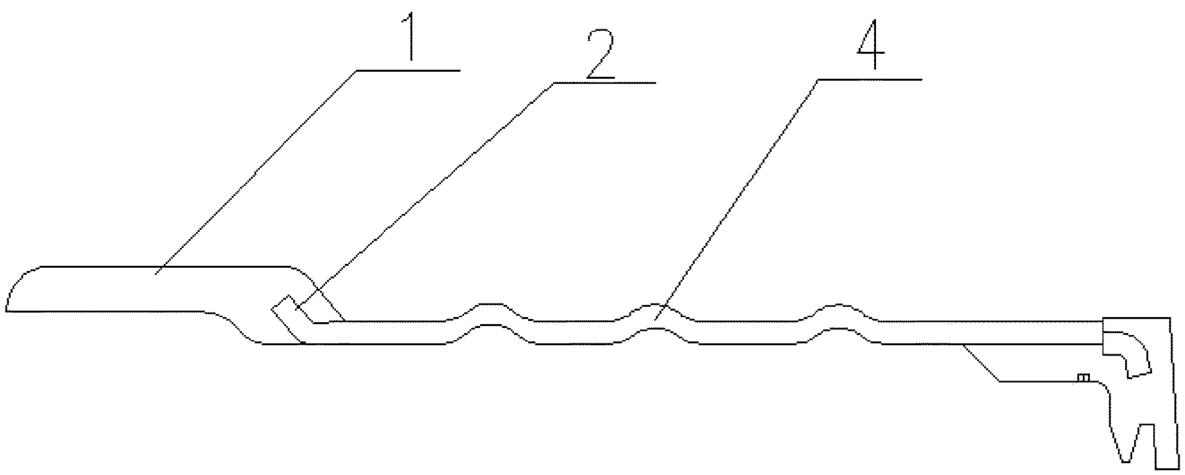
FIG. 2 is a schematic view illustrating a structure of a module housing of a loudspeaker module according to a second embodiment of the present disclosure.

FIG. 2 shows a schematic structure of a module housing according to the second embodiment of the present disclosure.

A loudspeaker module according to a second embodiment of the present disclosure includes a module housing and a loudspeaker unit, wherein the module housing has a cavity and the loudspeaker unit is accommodated in the cavity, and the loudspeaker unit divides the cavity into a front acoustic cavity and a rear acoustic cavity. A sound outlet hole is provided on the module housing, and the front acoustic cavity is communicated with the sound outlet hole through a sound outlet channel. A concave-convex structure is provided separately in a region of the module housing corresponding to the sound outlet channel.

As a specific embodiment, the module housing includes an upper module housing and a lower module housing (not shown in the figure) coupled to the upper module housing. The upper module housing further includes an injection molding portion 1 fixed to the lower module housing and a main body portion embedded in the injection molding portion 1. Wherein, the main body portion further includes a combining portion 2 combined with the injection molding portion 1 and a central portion located inside the combining portion 2, the combining portion 2 is injection molded into the injection molding portion 1. In other words, other parts of the main body portion, except for the structure of the main body portion injection molded into the injection molding portion 1, can be considered as the central portion. In order to improve the strength of the upper module housing and reduce s influence thereof on the front acoustic cavity of the loudspeaker module, a concave-convex structure distributed separately is disposed on the central portion.

In the second embodiment, the central portion can be provided as a rectangular structure or a circular structure or else according to the shape of the product, and the concave-convex structure can only include an arc-shaped protrusions 4 provided on the central portion, and a position where the arc-shaped protrusion 4 is not provided can be considered as a groove structure. In the specific example shown in FIG. 2, the concave-convex structure has several arc-shaped protrusions 4 regularly distributed, parameters such as the numbers and spacing of the arc-shaped protrusions 4 can be adjusted according to production requirements and manufacturing process of the product, and no specific limitations are made here.

Specifically, the arc-shaped protrusions 4 can be considered as several arc-shaped protrusion points regularly distributed on the central portion, and can also be considered as a continuous arc protrusion structure provided around the central portion, and a plurality of continuous protrusion structures can be sequentially provided.

In a specific embodiment of the present disclosure, in order to improve the firmness of the connection between the combining portion 2 and the injection molding portion 1, an alignment slot or an alignment bending may also be provided on the combining portion 2, and the alignment slot or the alignment bending can increase the contact area between the combining portion 2 and the injection molding portion 1, so as to increase the stability of the upper module housing.

Specifically, the alignment slot may be provided as a continuous alignment slot surrounding the combining portion 2, or at least two alignment slots provided separately on the combining portion 2.

It should be noted that the main body portion can be a steel sheet or another alloy sheet, and the concave-convex structure can be directly provided on the main body portion through a processing technology, that is, the concave-convex structure and the main body portion are integrally formed.

Figure 3:
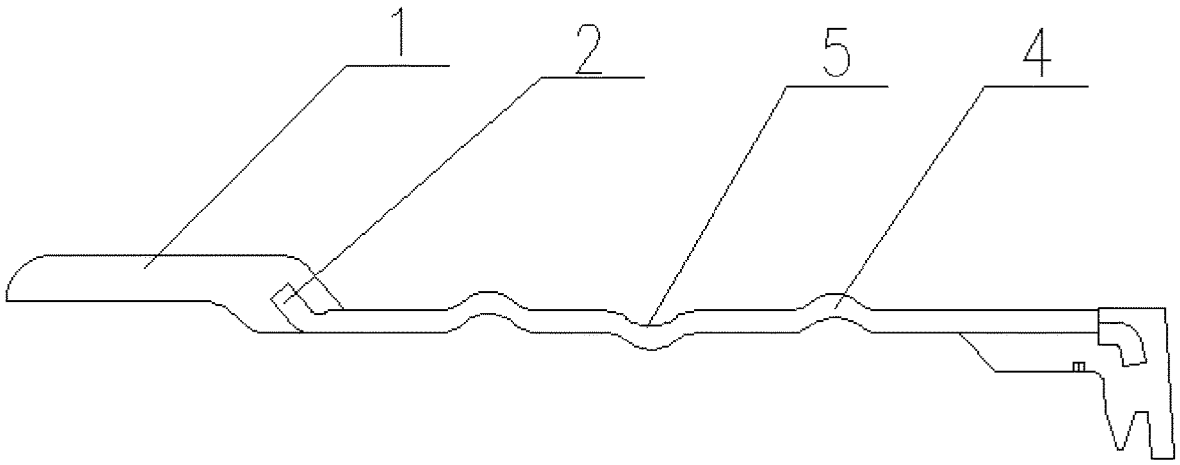
FIG. 3 is a schematic view illustrating a structure of a module housing of a loudspeaker module according to a third embodiment of the present disclosure.

FIG. 3 shows a schematic structure of a module housing according to a third embodiment of the present disclosure.

A loudspeaker module according to the third embodiment of the present disclosure includes a module housing and a loudspeaker unit, wherein the module housing has a cavity and the loudspeaker unit is accommodated in the cavity, and the loudspeaker unit divides the cavity into a front acoustic cavity and a rear acoustic cavity. A sound outlet hole is provided on the module housing, the front acoustic cavity is communicated with the sound outlet hole through a sound outlet channel. A concave-convex structure is provided separately in a region of the module housing corresponding to the sound outlet channel.

As a specific embodiment, the module housing includes an upper module housing and a lower module housing (not shown in the figure) coupled to the upper module housing. The upper module housing further includes an injection molding portion 1 fixed to the lower module housing and a main body portion embedded in the injection molding portion 1. Wherein, the main body portion further includes a combining portion 2 combined with the injection molding portion 1 and a central portion located inside the combining portion 2, the combining portion 2 is injection molded into the injection molding portion 1. In other words, other parts of the main body portion, except for the structure of the main body portion injection molded into the injection molding portion 1, may be considered as the central portion. In order to improve the strength of the upper module housing and reduce influence thereof on the front acoustic cavity of the loudspeaker module, a concave-convex structure distributed separately is disposed on the central portion.

In the third embodiment, the central portion can be provided as a rectangular structure or a circular structure or else according to the shape of the product, the concave-convex structure includes an arc-shaped protrusion 4 and an arc-shaped groove 5 that are provided on the central portion and separated evenly. In the specific example as shown in FIG. 3, the concave-convex structure includes two arc-shaped protrusions 4 and an arc-shaped groove 5 located between the two arc-shaped protrusions 4, the number and spacing of the arc-shaped protrusion 4 or the arc-shaped groove 5 can be adjusted according to the production requirement and manufacturing process of the product, and no specific limitations are made here.

Specifically, the arc-shaped protrusion 4 and the arc-shaped groove 5 can be considered as several arc-shaped protrusion 4 points and arc-shaped groove 5 points regularly distributed on the central portion, and can also be considered as a continuous protrusion structure and a continuous groove structure provided around the central portion. For example, when the upper module housing has a circular structure, the concave-convex structure can be configured to include a structure of an annular protrusion and an annular groove provided separately on the central portion.

In a specific embodiment of the present disclosure, in order to improve the firmness of the connection between the combining portion 2 and the injection molding portion 1, an alignment slot or an alignment bending may also be provided on the combining portion 2, and the alignment slot or the alignment bending can increase the contact area between the combining portion 2 and the injection molding portion 1, so as to increase the stability of the upper module housing.

Specifically, the alignment slot may be provided as a continuous alignment slot surrounding the combining portion 2 or at least two alignment slots provided separately on the combining portion 2.

It should be noted that the main body portion can be a steel sheet or another alloy sheet, and the concave-convex structure can be directly provided on the main body portion through a processing technology, that is, the concave-convex structure and the main body portion are integrally formed.

Corresponding to the above-mentioned module housing, the present disclosure also provides an electronic device including the above-mentioned loudspeaker module. The loudspeaker module includes the above-mentioned module housing and a loudspeaker unit accommodated in the cavity. Wherein, the upper module housing of the module housing and the loudspeaker unit form the front acoustic cavity, the central portion of the upper module housing is located at the front acoustic cavity of the loudspeaker module. The central portion can enhance the strength of the upper module housing, suppress the resonance of the module housing and improve the high-frequency sensitivity of the loudspeaker module. In addition, the concave-convex structure disposed on the central portion can also ensure that the airflow velocity in the air pipe of the front acoustic cavity is always smooth, suppress the generation of airflow sound, and improve the poor high-order acoustic distortion of products.

The loudspeaker module and the electronic device according to the present disclosure are described above by way of example with reference to the accompanying drawings. However, those skilled in the art should understand that various improvements can be made to the loudspeaker module and the electronic device provided by the present disclosure without departing from the content of the present disclosure. Therefore, the protection scope of the present disclosure should be determined by the content of the appended claims.

What is claimed is:

1. A loudspeaker module, comprising a module housing and a loudspeaker unit, wherein the module housing has a cavity and the loudspeaker unit is accommodated in the cavity, and the loudspeaker unit divides the cavity into a front acoustic cavity and a rear acoustic cavity, wherein a sound outlet hole is provided on the module housing, and the front acoustic cavity is communicated with the sound outlet hole through a sound outlet channel, wherein a concave-convex structure is provided separately in a region of the module housing corresponding to the sound outlet channel, wherein the module housing comprises an upper module housing and a lower module housing that are coupled to each other, wherein the upper module housing comprises an injection molding portion and a main body portion embedded in the injection molding portion, wherein at least a part of the injection molding portion is coupled to the lower module housing, wherein the main body portion comprises a combining portion combined with the injection molding portion and a central portion located inside the combining portion, wherein the concave-convex structure is disposed on the central portion.

2. The loudspeaker module of claim 1, wherein the concave-convex structure comprises a wave-shaped structure or a zigzag-shaped structure regularly distributed on the module housing.

3. The loudspeaker module of claim 2, wherein when the concave-convex structure comprises a wave-shaped structure, the concave-convex structure comprises two peaks and three valleys disposed separately.

4. The loudspeaker module of claim 1, wherein the concave-convex structure comprises an annular protrusion and an annular groove separately provided on the module housing.

5. The loudspeaker module of claim 1, wherein the concave-convex structure comprises an arc-shaped protrusion and an arc-shaped groove regularly distributed on the module housing.

6. The loudspeaker module of claim 1, wherein an alignment slot is provided on the combining portion, wherein the alignment slot is a continuous alignment slot surrounding the combining portion, or wherein the alignment slot is at least two alignment slots separately provided on the combining portion.

7. The loudspeaker module of claim 1, wherein the main body portion is a steel sheet or an alloy sheet.

8. The loudspeaker module of claim 1, wherein the concave-convex structure and the main body portion are integrally formed.

9. An electronic device, comprising the loudspeaker module of claim 1.

* * * * *